United States Patent
Zecchi et al.

(10) Patent No.: US 9,623,361 B2
(45) Date of Patent: Apr. 18, 2017

(54) FILTER PROVIDED WITH STRUCTURAL ELEMENTS, IN PARTICULAR FOR A ROTARY SEPARATOR

(71) Applicant: GE AVIO S.r.l., Rivalta di Torino (IT)

(72) Inventors: Stefano Zecchi, La Loggia (IT); Federico Dellavalle, Pinerolo (IT); Daniele Coutandin, Avigliana (IT)

(73) Assignee: GE AVIO S.R.L., Turin (IT)

( * ) Notice: Subject to any disclaimer, the term of this patent is extended or adjusted under 35 U.S.C. 154(b) by 0 days.

(21) Appl. No.: 14/143,976

(22) Filed: Dec. 30, 2013

(65) Prior Publication Data

US 2014/0182253 A1    Jul. 3, 2014

(30) Foreign Application Priority Data

Dec. 31, 2012  (IT) .............................. B02012A0716

(51) Int. Cl.
B01D 46/00 (2006.01)
B01D 46/26 (2006.01)

(52) U.S. Cl.
CPC ........ B01D 46/26 (2013.01); *B01D 2275/202* (2013.01); *B01D 2279/60* (2013.01)

(58) Field of Classification Search
CPC .... B01D 46/00; B01D 46/0056; B01D 46/26; B01D 2275/202; B01D 2279/60
USPC ................... 55/495, 490–492, 421
See application file for complete search history.

(56) References Cited

U.S. PATENT DOCUMENTS 5,716,423 A    2/1998  Krul et al.
2004/0129651 A1*  7/2004  Vanhoutte .......... B01D 39/2044
                                                                210/798

FOREIGN PATENT DOCUMENTS

EP    0117065 A1    8/1984
EP    0992273       4/2000
EP    2156941 B1 *  1/2013
WO    0206659 A1    1/2002

OTHER PUBLICATIONS

Italian Search Report dated Sep. 24, 2013 corresponding to Italian Application No. BO2012A 000716; 8 pages.

* cited by examiner

*Primary Examiner* — T. Bennett McKenzie
(74) *Attorney, Agent, or Firm* — Ohlandt, Greeley, Ruggiero & Perle, LLP

(57) ABSTRACT

A filtering body, in particular for a rotary separator, extends about an axis and has a two opposite axial faces, a radially outer surface and a radially inner surface; the filtering body comprises a filtering net constituted by filaments defining a plurality of pores between them; a frame, which is defined by non-porous solid elements, supports the filtering net and made in one piece with a filtering net; the frame has at least one element arranged in an intermediate radial position between the radially outer and inner surfaces.

6 Claims, 6 Drawing Sheets

FILTER PROVIDED WITH STRUCTURAL ELEMENTS, IN PARTICULAR FOR A ROTARY SEPARATOR

The present invention relates to a filter provided with structural elements, in particular for a rotary air/oil separator in a turbine engine.

BACKGROUND OF THE INVENTION

As known, in aeronautic turbine engines, the oil used for lubricating the bearings and cooling the transmission tends to mix with air. However, the used oil must be retrieved and re-introduced into the hydraulic circuit of the engine, in order to limit consumption and reduce the polluting substances discharged into the atmosphere. Various devices, either of the static type, named cyclones, or of the rotating type, named rotary separators or deoilers, may be used in order to separate the oil from the air. The latter are generally defined by metallic filtering nets.

Both devices are usually used, to separate oil particles having diameters in very different dimensional ranges. Commonly, cyclone devices are used to separate the larger sized oil drops suspended in air and degassing the larger air bubbles suspended in oil from the oil. Cyclone technology, in all cases, cannot separate the smaller oil drops and the smaller air bubbles. In general, the smaller air bubbles dissolved in the oil do not generate major drawbacks. The smaller oil drops, on the other hand, are separated and collected by means of a rotary separator arranged after the cyclone device along the air-oil mixture flow path.

The rotary separator comprises a toroidal-shaped filter, which is fitted on a rotor and has a pack of annular bodies each defined by a respective metallic filtering net. The filter, on a face thereof, receives the introduced air-oil mixture, lets through the air towards the rotor axis and withholds the oil particles in the pores of the metallic filtering net.

In the metallic filtering net, the rotation has the double function of:
- increasing the number of potential collisions of the oil drops against the filtering elements of the net, determining oil coalescence in form of film, which covers such filtering elements;
- centrifuging the oil film towards the outer periphery of the filter so as to retrieve such oil.

Using a rotary separator causes an additional pressure loss in the compressed air system of the turbine engine. Such an aspect becomes particularly critical when the revolution speed of the engine, and thus of the compressor, is relatively low. Indeed, in such operating conditions (idle or taxi conditions) the air pressure in the bearing seals will also be low, with consequent incapacity to maintain sealing if the metallic filter net causes an excessive back pressure. The metallic filtering net structure must be designed in extremely careful manner to obtain a correct trade-off between pressure loss and separation efficiency.

Patent application having publication number EP2156941A1, in the name of the same applicant, and other documents of the prior art teach to manufacture filtering bodies by means of layer by layer or additive manufacturing techniques, which employ an energy beam, i.e. a focused electron beam or a focused laser light beam, to obtain the localized melting and/or sintering of subsequent layers of powders having the same composition as the end product to be obtained. The zones to be melted are established by means of a three-dimensional numerical model which represents the product to be made and which is stored in an electronic unit configured so as to control the energy beam.

These techniques are known, for example, as Direct Laser Forming (DLF), Laser Engineered Net Shaping (LENS), Direct Metal Laser Sintering (DMLS), Selective Laser Melting (SLM), or Electron Beam Melting (EBM).

In the techniques in which sintering is required, the energy beam heats the outer surface of the powder grains so as to melt only such outer surface which joins with that of the adjacent grains. In this manner, the pores of the filter are defined by the gaps between the powder grains joined to one another.

Patent application EP2156941A1, on the other hand, relates to a technique requiring the melting of the powders: the powders have smaller granulometry than those used for sintering and their grains are completely melted. The pores of the filter are defined by the powder parts which are not concerned by the energy beam. Thus, the three-dimensional numerical model represents not only the outer shape of the filtering net but also its inner porous structure.

In particular, the three-dimensional model is generated by defining a base module, which represents a cell of the filtering net, and by replicating the same base module again and again until the shape and dimensions corresponding, in the three-dimensional model, to those of the filtering body to be made are reached. Document EP2156941A1 indicates making a porous cell structure of the diamond structure kind or honeycomb kind.

Thus, the method described in EP2156941A1 allows to define the geometry of the metallic filtering net to obtain the desired porosity of the filter in relatively accurate manner, also as a function of the different zones of the filter and as a function of the pressure loss caused by the rotary separator as a whole. Furthermore, it allows to make the porous structure of the filtering net uniform, and thus to balance the effects of the centrifuge force and position the centre of gravity of the filter exactly on the rotor axis.

Additionally, EP2156941A1 teaches to provide three-dimensional numeral models which integrate, together with the filtering net, solid material elements arranged along the outer edges of the filter, so as to have structure element which support the filtering net and thus reinforce the filter.

The need is felt to improve the known solutions described above, in order to maximize the oil capturing efficacy and to limit, at the same time, the back pressure in the compressed air system of the turbine engine.

SUMMARY OF THE INVENTION

It is the object of the present invention to make a filter provided with structural elements, in particular for a rotary separator, which allows to simply and cost-effectively meet the aforementioned need.

According to the present invention, a filtering body, in particular for a rotary separator, is made.

BRIEF DESCRIPTION OF THE DRAWINGS

For a better understanding of the present invention, a preferred embodiment will now be described by way of non-limitative example only and with reference to the accompanying drawings, in which.

DETAILED DESCRIPTION OF THE INVENTION

Figure 1:
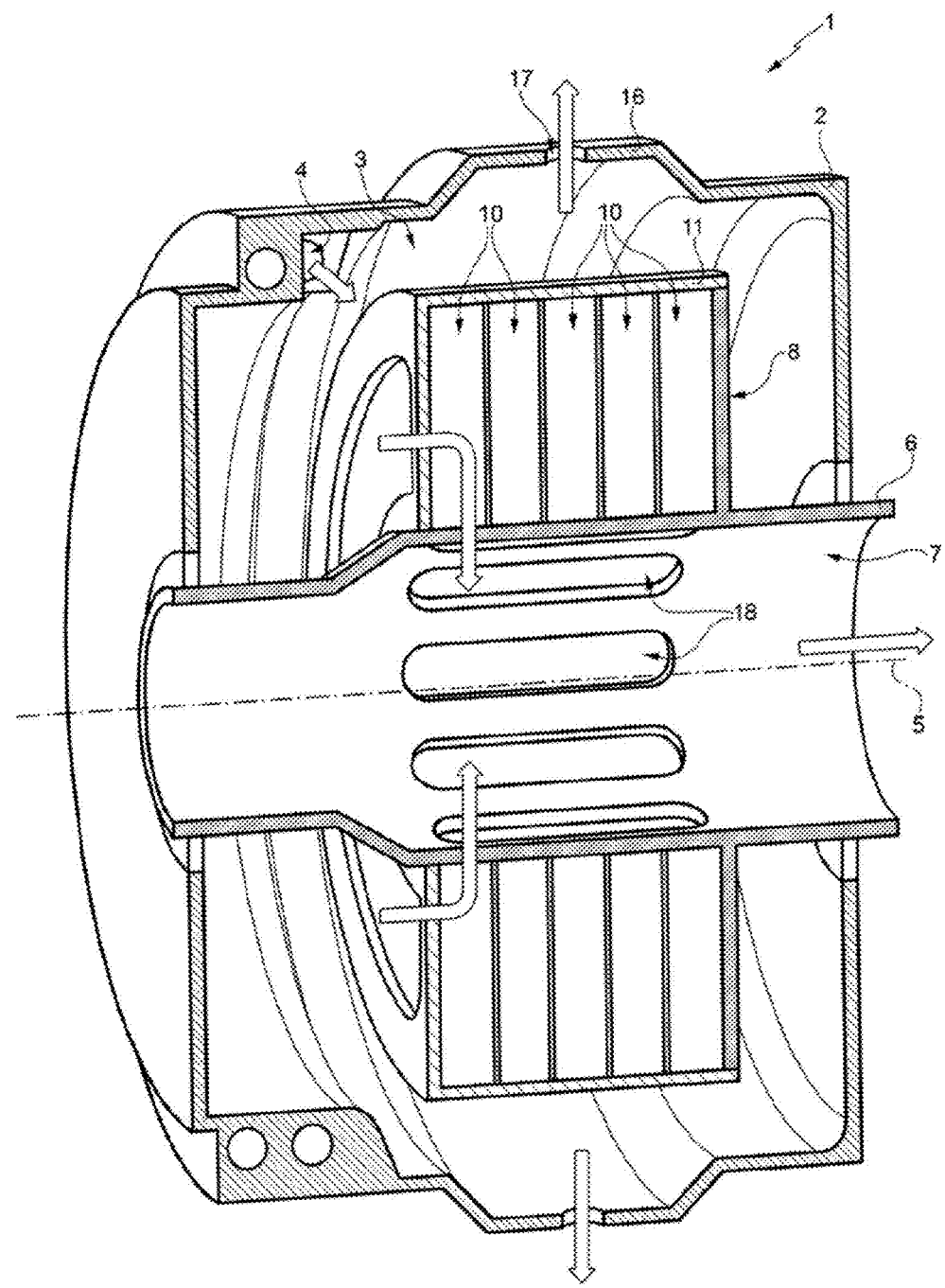
FIG. 1 is a section view which shows, in simplified manner, a rotary air/oil separator in a turbine engine, with a preferred embodiment of the filtering body according to the present invention.

In FIG. 1, reference numeral 1 indicates a rotary air/oil separator in a turbine engine.

The separator 1 comprises a casing 2 defining an inner chamber 3 having an inlet 4, from which a mixture of air and oil enters, in direction substantially tangential with respect to an axis 5. Furthermore, the separator 1 comprises a rotor 6 (partially shown), which extends along the axis 5 in the chamber 3, is rotatably fed about the axis 5 (in manner not shown) and internally defines an axial cavity 7, communicating with an outlet (not shown) for discharging air.

The separator 1 further comprises a filter 8, which is accommodated in the chamber 3, is supported by the rotor 6 in fixed coaxial position, is toroidal and comprises a plurality of annular filtering bodies. Such bodies are indicated by reference numeral 10, generally named "discs", are coaxial, axially rest against one another and are restrained to one another by means of driving pins or fastening pins (not shown) for coupling and transmitting the rotation torque.

In FIG. 1, the filter 8 comprises a cage 11, which supports and contains the discs 10 and is shaped so as to leave open an axial inlet for the mixture, an outer radial outlet for the oil and a radial inner outlet for the air. However, according to variants (not shown), the cage 11 could be absent and/or the filter 8 could comprise a single disc 10.

Preferably, the oil and air phases of the mixture undergo a first rough separation in chamber 3. The mixture enters the filter 8 frontally by effect of the pressure difference between the chamber 3 and the axial cavity 7. Considering a single disc 10 of the filter 8 (shown partially and in cross-section in FIG. 6), the mixture enters through an axial face 11a and/or through an outer cylindrical surface 12 of the disc 10. The oil exits through the surface 12, and the air exits through a cylindrical inner surface of the disc 10. The disc 10 has a face 11b, also permeable to the mixture, from the opposite side of the face 11a.

The discs 10 comprise respective filtering nets 14, defining porous structures which separate the two phases of the mixture. In particular, the rotation of the filter 8:
increases the number of potential collisions of the oil drops with the elements or filaments of the filtering nets 14 (as will be explained again below) and thus determines the coalescence of the oil inside the pores, e.g. in form of film which covers such elements or filaments;
centrifuges the oil captured in the pores and expels it outwards by effect of the inertia of the oil itself.

Again with reference to FIG. 1, the centrifuged oil exits through the surface 12, as mentioned above, and deposits on a portion 16 of the casing 12. The portion 16 has an outlet 17, through which the oil flows to be collected in a tank (not shown) belonging to a hydraulic circuit of the turbine engine.

At the same time, the air flows into the axial cavity 7 through some radial openings 18 made in the rotor 6, and the axial cavity 7 is then discharged off-board into the atmosphere.

Reference will be made to only one of the discs 10 for the sake of simplicity in the following description, because the discs 10 are substantially equal to one another. Preferably, as shown in the diametric cross-section in FIG. 6 and will be described in detail below, the disc 10 comprises a frame 20, which is constituted by solid (i.e. non-porous) structural elements and is integral with the filtering net 14 (i.e. made in one piece with the filtering net 14) so as to support the elements or filaments of the filtering net 14.

The material of the disc 10 is metallic and defined, for example, by a titanium alloy or a nickel-chromium alloy.

The forming method and the machine for manufacturing the disc 10 correspond to the indications of patent application EP2156941A1, the description of which is incorporated here at least for the parts necessary to understand and carry out the present invention.

In brief, the disc 10 is made by means of layer by layer or additive manufacturing techniques which employ an energy beam, e.g. a focused electron beam or a focused laser beam, to melt subsequent layers of powder having the same composition as the end product to obtain in localized manner. In general, the powders have a granulometry comprised in the range from 20 to 150 μm.

The scanning of the energy beam on each layer of powder is controlled by an electronic control unit in which a three-dimensional numerical model is stored. Such a model represents the desired shape, dimensions and porous inner structure of the disc 10, and may be generated, for example, by means of a computer assisted design (CAD) software. Each layer of powders is melted in localized zones, which are selected by the electronic control unit on the basis of the three-dimensional numerical model data. For each layer, the melted part "amalgamates" with the previously formed part underneath belonging to the previous layer. Progressively, layer by layer the height of the product increases to obtain the end finished product. Residual powder grains remain in the zones which are not melted in each layer. The spaces occupied by such a residual powder are freed at the end of the forming method and define the pores of the filtering net 14.

Figure 2:
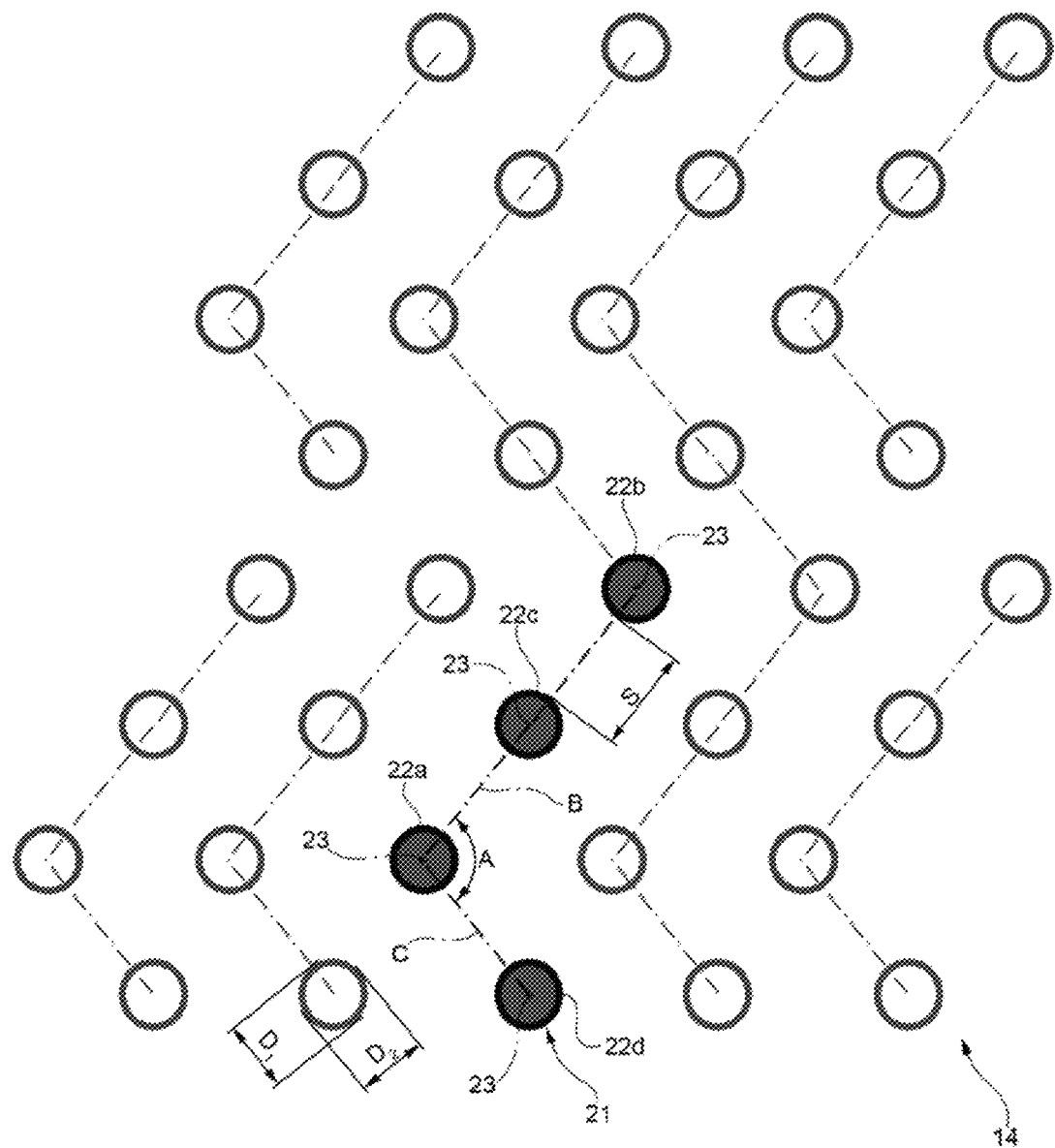
FIG. 2 is a diagrammatic cross-section on enlarged scale of the filtering net of the filtering body in FIG. 1, taken along a section plane which is orthogonal to elongated filtering elements belonging to such a filtering net.
Figure 3:
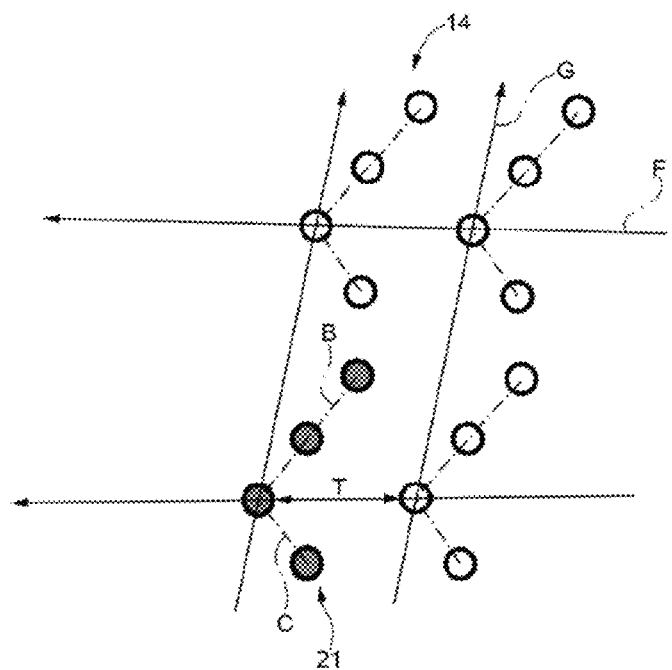
FIGS. 3 and 4 are similar to FIG. 2 and show respective examples of how the filtering net can be obtained by replicating a base cell.
Figure 4:
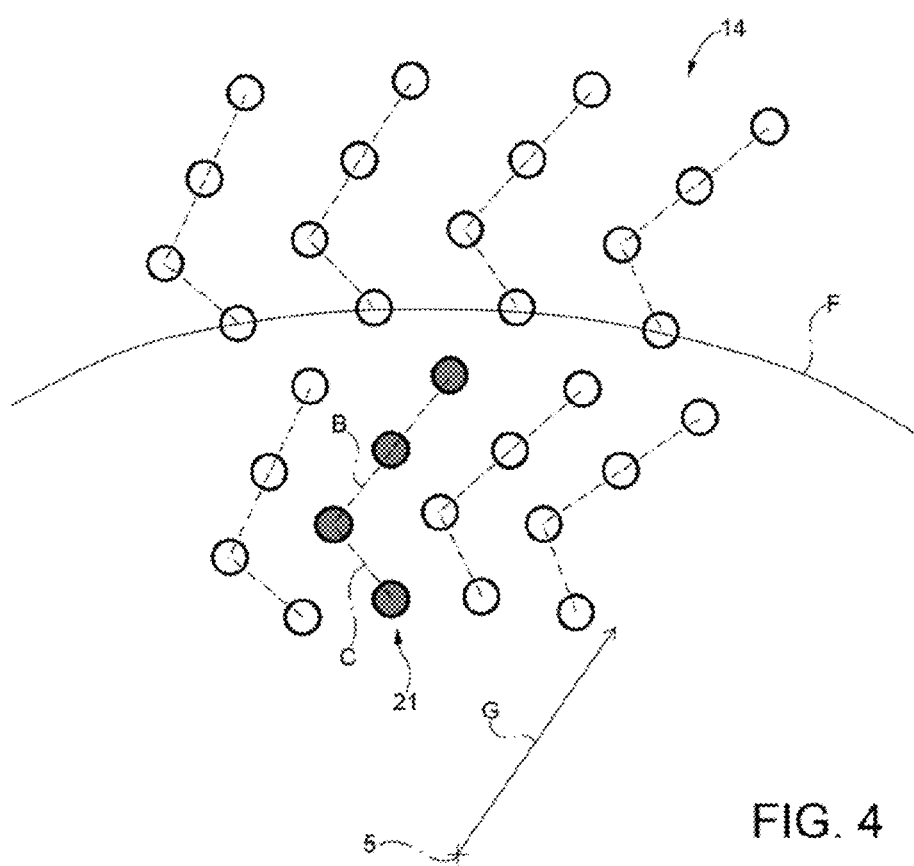

With reference to what diagrammatically illustrated in FIGS. 2 to 4, the filtering net 14 has a porous cell structure constituted by the replication of a base cell 21. Therefore, the part of the three-dimensional numeral model which defines the filtering net 14 is generated by defining a base module, which represents the base cell 21, and by replicating such a base module to reach the shape and dimensions corresponding, in the model, to those of the filtering net 14 or a sector of the filtering net 14.

By virtue of the replication of the base module, the dimensions and the shape of the cells of the filtering net 14 are substantially identical to one another so that the distribution of the pores corresponds to that designed in design and is uniform.

The base module of the three-dimensional numerical model comprises a plurality of filiform elements which correspond to respective elongated filtering elements of the base cell 21. Hereinafter, the elongated filtering elements of the filtering net 14 are indicated with the word "filaments" (diagrammatically illustrated by lines or cylinders in FIGS. 5*a*, 5*b*, 5*c* and 6).

The porosity is set substantially on the three-dimensional numerical model to obtain the required trade-off between the various needs (having good filtering properties; avoiding excessive back pressures; facilitating the evacuation of the residual powders from the pores at the end of the forming procedure; obtaining a light-weight filter etc.).

The configuration of the base module, and consequently the configuration of the base cell 21, are chosen so as to optimize the capture of oil by the filtering net 14.

Figure 5A:
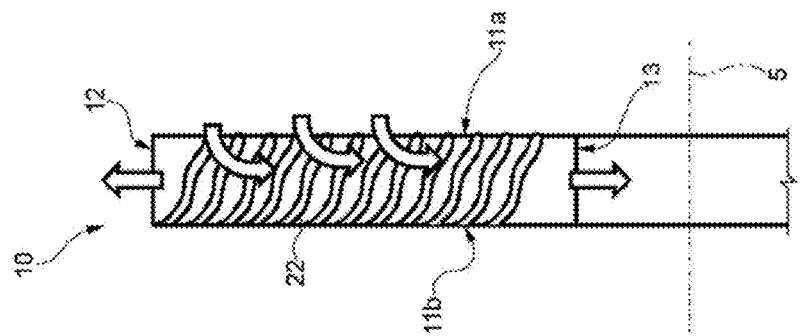
FIGS. 5a-5c show respective configurations of the filtering elements in FIG. 2.
Figure 5B:
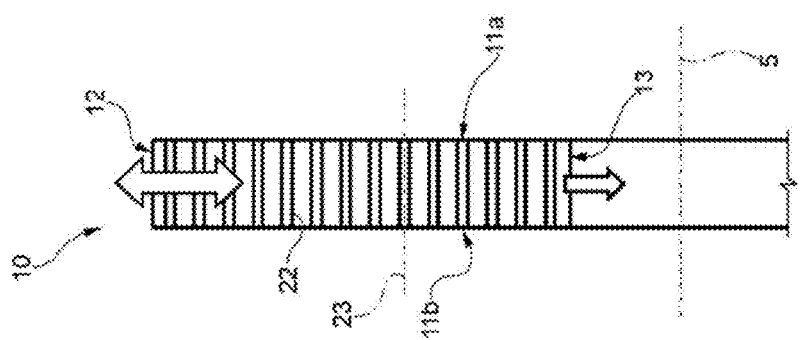
Figure 5C:
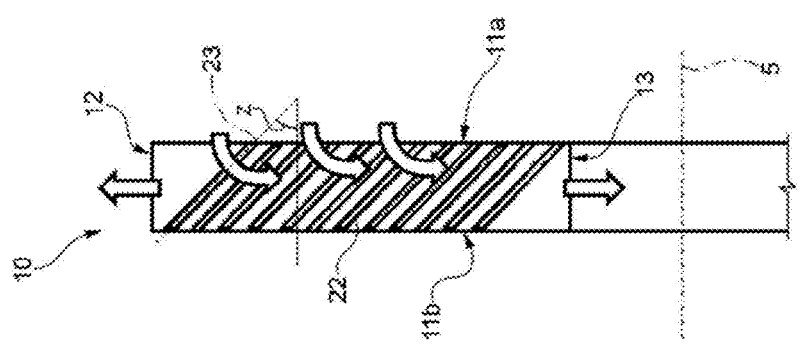

The filaments 22 of the base cell 21 extend along respective axes 23, which are parallel. As shown in FIGS. 5*a*-5*c*, the axes 23 may be rectilinear, curved or defined by broken lines. The axes 23 are oriented so that the filaments 22 are transversal to a mean input direction of the air-oil mixture in the disc 10. Such figures also show that the filaments 22 of the cells of the filtering net 14 extend continuously from face 11*a* to face 11*b*, but this must not be understood as limiting. Indeed, the height of the base cell 21 along the axes 23 may be smaller, and the filtering net 141 could have other filtering elements in intermediate position between the faces 11*a*,11*b* at the ends of the cells.

The cross-section of each filament 22 is substantially constant along the respective axis 23. Furthermore, the cross-section of the filiform elements in the three-dimensional numeral model is set equal for all filiform elements, so that the filaments 22 have cross-sections identical to one another.

As shown in FIG. 2, the filaments 22 of the base cell 21 are comprised between three and six, of which at least one intermediate filament (22*a*) and two end filaments (22*b*, 22*d*), arranged on opposite parts of the intermediate filament. Furthermore, by sectioning the base cell 21 with any plane P (corresponding to the plane in FIG. 2) orthogonal to the axes 23, the traces of the axes 23 are arranged along two straight lines B and C, which are incident at the trace of the axes 23 of the intermediate filament 22*a* so as to form substantially an L, or the sides of a triangle. In other words, the straight lines B and C join the trace of each axis 23 with that of the adjacent axis 23 in the base cell 21. If the number of filaments 22 of the base cell 21 is higher than or equal to four, as in the illustrated example, the straight line B intercepts the end filament 22*b* and at least one further intermediate filament 22*c*, which is arranged between the filaments 22*a* and 22*b* in addition to the intermediate filament 22*a*. The straight line C, on the other hand, defines the smaller side of the L or of the triangle, because it intersects only the intermediate filament 22*a* and the end filament 22*d*.

The incidence angle A between the straight lines B and C is comprised between approximately 90° and 160°.

Furthermore, the distance or gap S measured along the straight lines B and C between the pairs of adjacent filaments (22*a*-22*d*, 22*a*-22*c*, 22*b*-22*c*) is equal and preferably is comprised between approximately 0.1 and 3 times the maximum dimension of the cross-section of the filaments 22*a*,22*b*,22*c*,22*d*.

This configuration assigns a relative position of the filaments 22, which allows to intercept the filaments with the air-oil mixture streams caused by the filaments 22 arranged upstream along the direction of flow of mixture. The ranges assigned to the dimensional and orientation parameters of the base cell 21 allow to have a margin for defining the correct interaction between the streams and the obstacles, and thus the optimal capturing efficiency as a function of the actual operative conditions.

Again with reference to FIG. 2, measuring the dimensions D1 and D2 of the cross-section of the filaments 22 along any two directions which are orthogonal and lie on the plane P, each of such dimensions D1, D2 is preferably comprised between approximately 0.1 and 0.8 mm. Also such a range of values allows to optimize the oil capturing efficiency because the efficiency depends on the dimensions of the obstacles that the mixture encounters in the filtering net 14. In particular, the shape of the cross-section is circular. However, other shapes (elliptical, polygonal) could be used in order to optimize the fluid-dynamics of the mixture flow about the filaments 22.

As mentioned above, the base module, which represents the base cell 21 in the three-dimensional numerical model, is repeated to reach a desired extension corresponding to that of the entire filtering net 14 or to that of a sector or segment of the filtering net 14. The replication occurs along at least two transversal directions of replication. Considering the FIGS. 3 and 4, the porous structure constitutes a plurality of cells obtained by replicating the base cell 21 along a direction F and a direction G, but non necessarily rectilinear, which are transversal and lie on the plane P.

In the case (not shown) in which the axial height of the base cell 21 is smaller than the extension of the filtering net 14, the base cell 21 also would be replicated along a third direction, substantially parallel to the axes 23.

Preferably, direction F is substantially tangential or substantially circumferential with respect to axis 5. The base cell 21 is positioned so as to form any angle between direction F and the straight line C (i.e. an angle comprised between 0° and 180°).

In the case of FIG. 3, directions F and G are defined by respective straight line sheaves, which form an incidence angle comprised between approximately 30° and 150°. In this case, the replication of the base cell 21 occupies only a sector of the filtering net 14. The porous structure of the remaining part of the filtering net is defined by a rotation of a predetermined angular pitch about axis 5 of such a sector.

In the case of FIG. 4, on the other hand, figure F is defined by concentric circles, the centre of which coincides with the intersection of the axis 5 with the plane P. Direction G, on the other hand, is defined by a sheave of curves generated by a base curve (preferably a radial straight line) repeated with a determined angular pitch about the aforesaid centre.

With this configuration of axial-symmetric type, the size of the pore increases as the diameter of the disc 10 increases. Thus, the oil can exit the disc 10 more easily from the radially outermost parts. In the radially innermost parts, on the other hand, the obstacles defined by the filaments 22 are closer and tend to increase the air-oil separation effect.

The replication pitch of the base cell 21 along the two directions F and G is established so as to position the cells according to the advancement direction of the mixture flow (considered as mean direction or as directions in localized zones) and to optimize the interaction of the streams of the mixture with the obstacles defined by the filaments 22.

For example, the distance or gap T between two subsequent cells along direction F (FIG. 3) is comprised between approximately 0.1 and 3 times the maximum dimension of the cross-section of the filaments 22 (the replication pitch along direction F is equal to the sum of the gap T and of the dimension of the filament 22 along the same direction F).

More in general, the pitch and the other replication parameters allow to optimize the geometry of the porous structure of the filtering net 14 according to the operating conditions of the disc 10, i.e. to optimize the position of the obstacles against which the mixture strikes as a function of the direction of the local mixture flow itself. Furthermore, the porous structure may be designed in dedicated manner to satisfy specific requirements of a given application, while the geometries of the filtering nets of the prior art cannot be optimized or adapted except for a restricted number of parameters.

With reference again to figures from 5a to 5c, the orientation of the axes 23 in space depends on the specific application and is set so as to optimize the inclination angle of the obstacles against which the mixture strikes, as a function of the inlet direction of the mixture into the disc 10.

Typically, if the flow of mixture enters into the disc 10 in substantially radial direction, the axes 23 of the base cell 21 are parallel to the axis 5 (FIG. 5b).

If the flow of the mixture enters inclined with respect to the radial direction, when cross-sectioning the disc 10 with a diametrical section plane (FIGS. 5a, 5c and 6) the axes 23 of the filaments 22 form an inclination angle Z comprised between a few degrees and 50° with respect to axis 5 at the face 11a.

Independently from the inclination angle with respect to axis 5 and the possible curvature of the axes 23, the parallel configuration of the filaments 22, starting from face 11a, does not obstruct the introduction of the mixture and helps the radial evacuation of the oil outwards while working. Furthermore, the parallel configuration of the filaments 22 considerably simplifies the evacuation operations of the residual powders at the end of the forming procedure. Such advantages are amplified by the fact that the filaments 22 extend continuously from face 11a to face 11b, without intermediate filtering elements. According to variants (not shown), the filtering net 14 could comprise additional filtering grids which are substantially flat, extend along the faces 11a and/or 11b and are substantially made in one piece with the other elements of the disc 10.

Figure 6:
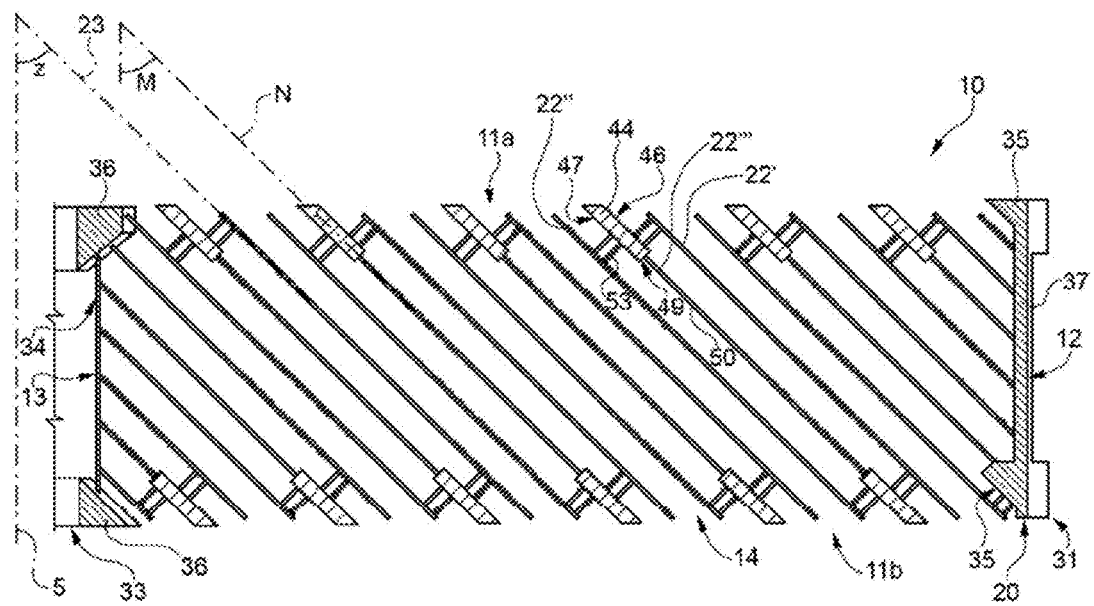
FIG. 6 shows a diagrammatic cross-section of the filtering body in FIG. 1.
Figure 8:
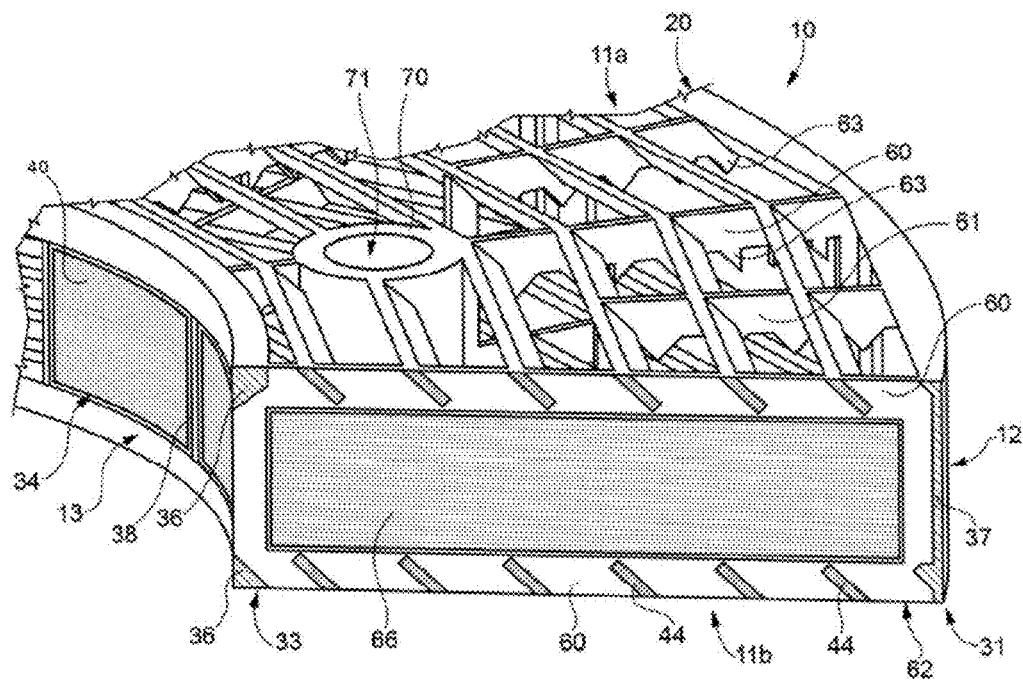
FIGS. 8 and 9 are perspective views of the filtering body in FIG. 6, with parts removed for clarity to highlight structural elements of the disc itself.
Figure 9:
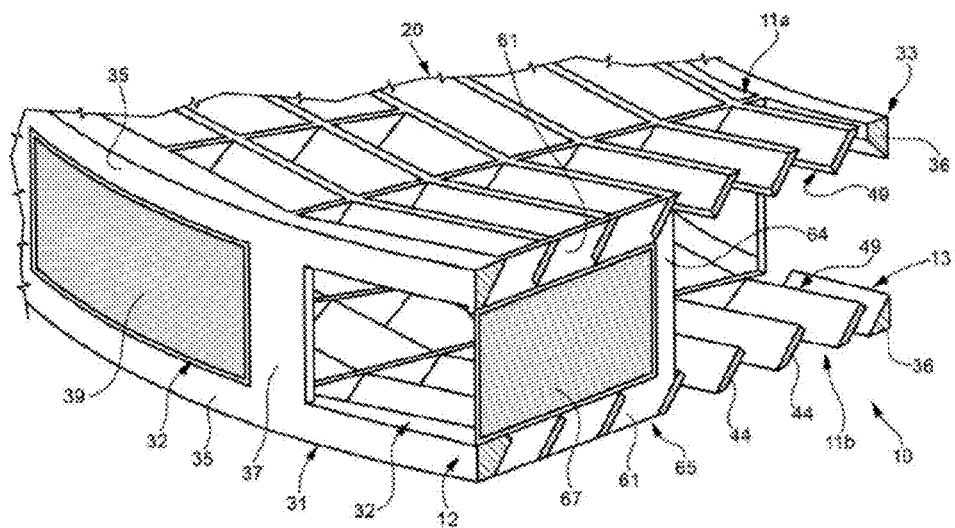

With reference to FIGS. 6, 8 and 9, as regards the frame 20, the latter comprises an outer peripheral structure or element 31, which is arranged along the surface 12 and defines at least one window 32 to allow the oil to exit radially towards the portion 16. Similarly, the frame 20 comprises an inner peripheral structure or element 33, which is arranged along the surface 13 and defines at least one window 34 to allow the air to flow into the axial cavity 7 through the openings 18.

In particular, the elements 31 and 33 comprises respective pairs of rings 35 and 36, arranged along the circular edges of the disc 10; and respective pluralities of crosspieces 37,38, which are spaced apart along the outer circumference and the inner circumference of the disc 10, respectively. The crosspieces 37 join the rings to one another and separate the windows from one another 32. Similarly, the crosspieces 38 join the rings 36 to one another and separate the windows 34 from one another.

The rings 35,36 are also called "hoops" and have the function of supporting the inertia loads caused by rotation. In other words, the rings 35,36 stiffen the disc 10 so as to limit the deformations of the filtering net 14 under load, and consequently guarantee the structural integrity of the disc 10.

The cross-section of the rings 35 and 36 may be a triangle, a trapezium, a circle, an ellipsis or a rectangle, and has an axial dimension S1 and a radial dimension S2, with S1 and S2 each included between approximately 1 and 5 mm. The shape and dimensions of the cross-section of the rings 35,36 are set so as to optimize the passage area and the path of the oil flows at the outer circumference and of the air flows at the inner circumference, respectively. Furthermore, the shape and dimensions of the cross-section of the rings 35,36 are set so as to integrate the rings 35,36 with the position and the orientation of the filaments 22.

As shown in FIGS. 8 and 9, the windows 32 and 34 are engaged preferably by respective grids 39, 40, which are made in one piece with the filtering net 14 and the frame 20. The grids 39,40 substantially extend along the surface 12 and the surface 13, respectively, and consist of elongated or filiform elements (not shown), which are filtering, i.e. have a cross-section with dimensions substantially equal to those indicated for the filaments 22 (D1,D2).

The elongated filtering elements of the grids 39,40 are positioned so as to intersect the filaments 22 which end at the windows 32,34, so as to support the ends of such filaments 22. The elongated filtering elements of each grid 39,40 are parallel to one another.

In addition to the elements 31 and 33, in general the frame 20 comprises at least one element arranged in radial intermediate position between the surfaces 12 and 13.

In particular, the frame 20 comprises a plurality of elements defined by beams 44, which extend in either circumferential or tangential direction with respect to axis 5 and, together with the rings 35 and 36, stiffen the disc 10 and support the inertia loads caused by rotation for guaranteeing the structural integrity of the disc 10 and limit the deformations of the filtering net 14 under load.

As shown in the cross section in FIG. 6, the beams 44 also have the function of supporting the filaments 22. In particular, the beams 44 are arranged substantially along the faces 11a,11b and support the ends of the filaments 22 of the filtering net 14. In particular, the beams 44 have a flat cross-section, equal to one another, so as to define respective baffles which tend to guide the mean flow, or macro-flow, of the air-oil mixture which passes through the faces 11a,11b. The cross-sections of the beams 44 are elongated along directions N which, considering any diametrical section plane, are parallel to each other, and preferably are not orthogonal to the faces 11a,11b. In particular, the inclination angle M of the direction N with respect to axis 5 is equal to the inclination angle Z of the filaments 22. In the variant shown in the cross section in FIG. 7, on the other hand, the inclination angles M and Z are different.

The inclination angle M is comprised between approximately 0° and 75° and is set so as to obtain the correct direction of the mixture with respect to the filtering net 14 as a function of the operating conditions of the filter 8.

In particular, each beam 44 has two sides 46,47, one radially outer and the other radially inner, which are substantially parallel and define the direction N. Furthermore, each beam 44 has two bases 48,49 of smaller extension with respect to the sides 46,47: the base 48 axially faces outwards and does not support any other filament 22; the base 49, on the other hand, axially faces the inside of the disc 10. With reference to FIG. 9, the inclination angle M for the beams 44 arranged along the face 11b is such to orient the bases 49 towards the axis 5; on the other hand, the inclination angle M for the beams 44 arranged along the face 11a is such to orient the bases 49 towards the surface 12. Thus, the baffles defined by the beams 44 obstruct the centripetal radial motion of the mixture and help the centrifugal motion of the oil facilitating draining off from the filter 8.

As shown in FIG. 6, each beam 44, in a radial direction, is substantially arranged between two series of filaments 22' and 22" and is substantially aligned with a series of filaments 22'". The base 49 directly supports the end portions 50 of the filaments 22'", i.e. the portions 50 are butted to the base 49, so that the filaments 22''' extend starting from the base 49 towards the opposite axial face of the disc 10.

The sides 46,47 support the end portions of the filaments 22' and 22", respectively, by means of bridges 53 which are transversal to the ends of the filaments 22 and to the sides 46,47. The bridges 53 allow to obtain an optimal trade-off between weight and filtering features of the filtering net 14. Furthermore, the joining system exploits to the maximum the supporting potentiality of the beams 44 because it uses both the base 49 of each beam 44 and its sides 46,47 for joining groups of filaments 22 to the beam 44 itself.

Figure 7:
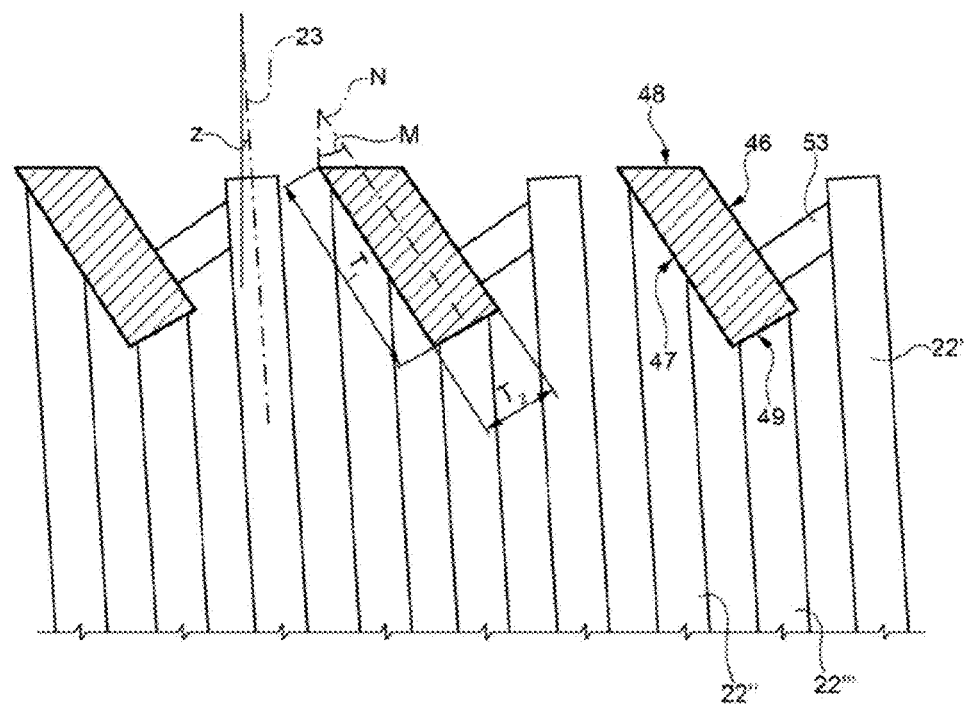
FIG. 7 shows a variant of FIG. 6 on enlarged scale.

When the inclination angles Z and M are different, as shown in the FIG. 7, one of the sides 46,47 of each beam 44 directly supports the filaments 22", without bridges 53, while the other of the sides 46,47 is provided with bridges 53.

The cross-section of the beam 44 may be circular, elliptical, trapezoidal, rectangular and is set so as to optimize the local fluid-dynamic conditions of the mixture. In the case of elongated cross-section, orthogonally to direction N the dimension T2 of each beam is the same order of size as the dimensions of the filaments 22, i.e. is comprised between approximately 0.1 mm and 1 mm; parallel to direction N the dimension T1 is comprised between approximately 1 mm and 15 mm (FIG. 7).

Again with reference to FIGS. 8 and 9, the frame further comprises pairs of elements 60,61, which extend in substantially radial direction through the filtering net 14. Preferably, the elements 60,61 are arranged along the faces 11a, 11b, so as to intersect the beams 44, and preferably have an axial dimension substantially equal to that of the beams 44. The elements 60,61 have the double function of transferring the centrifugal loads from the beams 44 towards the rings 35,36 and of acting as radial blades for expelling the oil and managing the fluid-dynamic field of motion of the mixture inside the disc 10.

The pairs of elements 60 are spaced apart about the axis 5 by a constant angle, so that each pair of elements 60 is arranged, in circumferential direction, between two adjacent sectors of the filtering net 14. Furthermore, the pair of elements 60 extend radially for the entire disc 10 and, advantageously, end radially at the crosspieces 37,38, so that each pair of elements 60 form, together with a crosspiece 37 and a crosspiece 38, a respective rectangular annular frame 62 (FIG. 8).

The pairs of elements 61 are intercalated between the pairs of elements 60 about the axis 5. In particular, each pair of elements 61 is arranged angularly at the half between two adjacent frames 62. The pairs of elements 61 extend only in an outer portion of the disc and end radially outwards at the rings 35, and radially inwards at respective crosspieces 64 which are parallel to axis 5 and are arranged in intermediate radial position between the surfaces 12 and 13. Thus, each pair of elements 61 and the corresponding crosspiece 64 form a respective U-shaped frame 65 (FIG. 9).

As the other components of the frame 20, the elements 60,61 also stiffen the disc 10 to limit deformations under load and to guarantee the structural integrity of the disc 10.

Furthermore, the elements 60,61 have a flat cross-section equal to one another, and elongated in direction parallel to axis 5, so as to define respective radial blades, as mentioned above, to improve the oil expulsion radially outwards. The cross-section may be shaped/dimensioned as to adjust the fluid-dynamic conditions of the mixture inside the disc 10. The elements 60,61 may generate a so-called impeller effect to optimize the local speed of the mixture and improve the interaction of the mixture itself with the filaments 22.

Preferably, the elements 60,61 have respective pluralities of ridges 63, which protrude in direction parallel to axis 5 towards the inside of the filtering net 14 with respect to the remaining part of the elements 60,61 and, for each element 60,61 are radially spaced apart.

In the illustrated example, the cross-sections of the elements 60,61 are rectangular with smaller base (in tangential direction) comprised between approximately 0.1 and 1 mm and larger base (in axial direction) comprised between approximately 1 and 10 mm. However, the cross-section could be different, e.g. circular or elliptical, to optimize the local fluid-dynamic conditions.

The frames 62,65 define respective openings corresponding to the passage section for mixing in tangential direction. Preferably, such openings are engaged by grids 66,67, which are made in one piece with the filtering net 14 and the frame 20, are substantially flat and extend in radial direction.

The grids 66,67 are constituted by elongated or filiform elements (not shown) which are filtering, i.e. which define obstacles for separating the oil-air phases of the mixture. In other words, the elongated filtering elements of the grids 66,67 has a cross-section of dimensions substantially equal to the values D1 and D2 of the filaments 22. The elongated filtering elements of the grids 66,67 are arranged in positions such as to intersect the filaments 22 which extend through the openings of the frames 62,65. In this manner, the elongated filtering elements of the grids 66,67 are joined to such filaments 22 and cooperate with the frame 20 in the support of the filtering net 14. As the grids 39 and 40, the elongated filtering elements of the grids 66,67 are parallel to one another.

With reference to FIG. 8, the frame 20 comprises a bushing 70, which extends from the face 11a of the face 11b and defines a cylindrical seat 71 parallel to the axis 5. The bushing 70 defines an interface element for coupling fastening pins, fastening pins or similar devices, which allow to pack and/or couple the various discs 10 axially, thus preventing relative rotations between the various discs 10 and transmitting the sliding friction from each disc 10 to the rest of the filter 8.

From the above, it is apparent that the disc 10 integrates, in a single piece, a blading and a metallic filtering net and thus allows to improve the air-oil separation and/or reduce the loss of pressure. In particular, the frame 20 may be shaped so as to guide the path of the mixture according to the orientation of the axes 23 of the filaments 22 to maximize separation efficacy. In other words, some elements of the frame 20 may be designed and dimensioned so as to perform a fluid-dynamic function of the air-oil mixture in addition to a stiffening and a supporting function of the filtering net because the elements are arranged in radial intermediate position between the surfaces 12 and 13, where the air-oil mixture passes, and are shaped as baffles or blades.

Furthermore, the solid, massive elements of the frame 20 may replace the cage 11 with advantages in terms of weight and of construction and assembly ease, because they integrate interface elements with the other components of the filter 8.

As mentioned above, the position, shape and dimensions of the structural elements which constitute the frame 20 can be configured as a function of the configuration of the filtering net 14 and the operating conditions.

At the same time, the position and dimensions of the obstacles of the filtering net 14 can be configured, within given limits, so as to make more or less close zones or zones with obstacles appropriately orientated as a function of specific operating conditions.

Being made by means of layer by layer technologies, the disc 10 is balanced and may be designed so as to be relatively light, by virtue of the fact that the porous structure is set in desired, predetermined manner by means of a three-dimensional cell model. Furthermore, the disc 10 has a porous structure and constant quality, independently from the shape complexity.

Other advantages are thus apparent from the above-described features.

It is finally apparent that changes and variations can be made to the filtering net 14 described and illustrated without departing from the scope of protection of the accompanying claims.

In particular, the frame 20 and the filtering net 14 could be used to form filter portions, e.g. to form sectors, which are then assembled to each other and/or used in fields other than aeronautics, e.g. in rotary separators in industrial systems or in turbines for marine propulsion and in electric generators.

The invention claimed is:

1. A filter comprising:
   a disc-shaped filtering body,
   wherein the disc-shaped filtering body comprises a first axial face, a second axial face and an axis extending from the first axial face to the second axial face;
   wherein the disc-shaped filtering body further comprises an inner surface located at the inner circumference of the disc-shaped filtering body and an outer surface located at the outer circumference of the disc-shaped filtering body;
   wherein the disc-shaped filtering body further comprises a frame disposed between the inner surface and the outer surface, wherein the frame comprises a plurality of beams, wherein each beam comprises a top surface, a bottom surface and a solid body extending from the top surface to the bottom surface, and wherein each beam is angled such that it slopes downwardly in a direction from the inner surface toward the outer surface such that the top surface of each beam is directed toward the inner surface while the bottom surface of each beam is directed toward the outer surface in a manner such that the solid body extends in a direction from the inner surface toward the outer surface; and
   wherein the disc-shaped filtering body further comprises a filtering net which is defined by filaments defining a plurality of pores therebetween, wherein the filtering net is supported by the frame and wherein the filtering net is made in one piece with the frame.

2. The filter according to claim 1, wherein each of said plurality of beams have the same cross-section, and wherein each of said plurality of beams is elongated in a direction parallel to said axis and has two substantially parallel faces each having an inclination angle of between approximately 0° and 75° with respect to said axis.

3. The filter according to claim 1, wherein each of said plurality of beams has two substantially parallel faces and supports the ends of three series of filaments, wherein two of said three series of filaments are supported, respectively, by said two substantially parallel faces, and wherein the third of said three series of filaments is substantially aligned with one of said plurality of beams.

4. The filter according to claim 3, further comprising a plurality of transversal bridges, which connect the ends of at least one of said series of filaments to the corresponding one of said two substantially parallel face.

5. The filter according to claim 1, wherein said frame comprises: an outer peripheral element arranged along said outer surface and defining at least one first window, and an inner peripheral element arranged along said inner surface and defining at least one second window.

6. The filter according to claim 5, wherein said at least one first window and said at least one second window are fitted with respective grids, wherein said respective grids are each formed by a plurality of elongated filtering elements, and wherein the plurality of elongated filtering elements have a portion that is joined to a portion of the ends of said filaments.

\* \* \* \* \*